US006801602B2

(12) United States Patent
Glossbrenner

(10) Patent No.: US 6,801,602 B2
(45) Date of Patent: Oct. 5, 2004

(54) METHOD OF INITIATING A CALL FEATURE REQUEST

(75) Inventor: Kenneth C. Glossbrenner, Red Bank, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 10/291,952

(22) Filed: Nov. 8, 2002

(65) Prior Publication Data

US 2003/0068017 A1 Apr. 10, 2003

Related U.S. Application Data

(63) Continuation of application No. 09/111,302, filed on Jul. 7, 1998, now Pat. No. 6,504,912.

(51) Int. Cl.[7] .............................................. H04M 1/64
(52) U.S. Cl. ........................ 379/88.01; 379/93.28; 379/201.12; 379/207.11; 379/372; 704/270.1
(58) Field of Search ....................... 379/88.01–88.04, 379/90.01, 93.01, 93.26–93.34

(56) References Cited

U.S. PATENT DOCUMENTS

| 5,524,139 A | * | 6/1996 | Jones ...................... 379/88.25 |
| 5,905,774 A | * | 5/1999 | Tatchell et al. .......... 379/88.04 |
| 5,917,890 A | * | 6/1999 | Brotman et al. ......... 379/88.01 |
| 6,094,476 A | * | 7/2000 | Hunt et al. .............. 379/88.04 |

* cited by examiner

*Primary Examiner*—Roland Foster

(57) ABSTRACT

A method of allowing a telephone network user to initiate a call feature request during an in-progress call using a conventional touch tone telephone with a telephone handset and conventional touch tone telephone keys. The method includes receiving and recognizing a touch tone signal resulting from the user pressing one or more of the telephone keys, recognizing a user spoken predetermined voice command, then interpreting the touch tone signal and voice command as a request for a call feature. The call feature is then provided in accordance with the request.

10 Claims, 1 Drawing Sheet

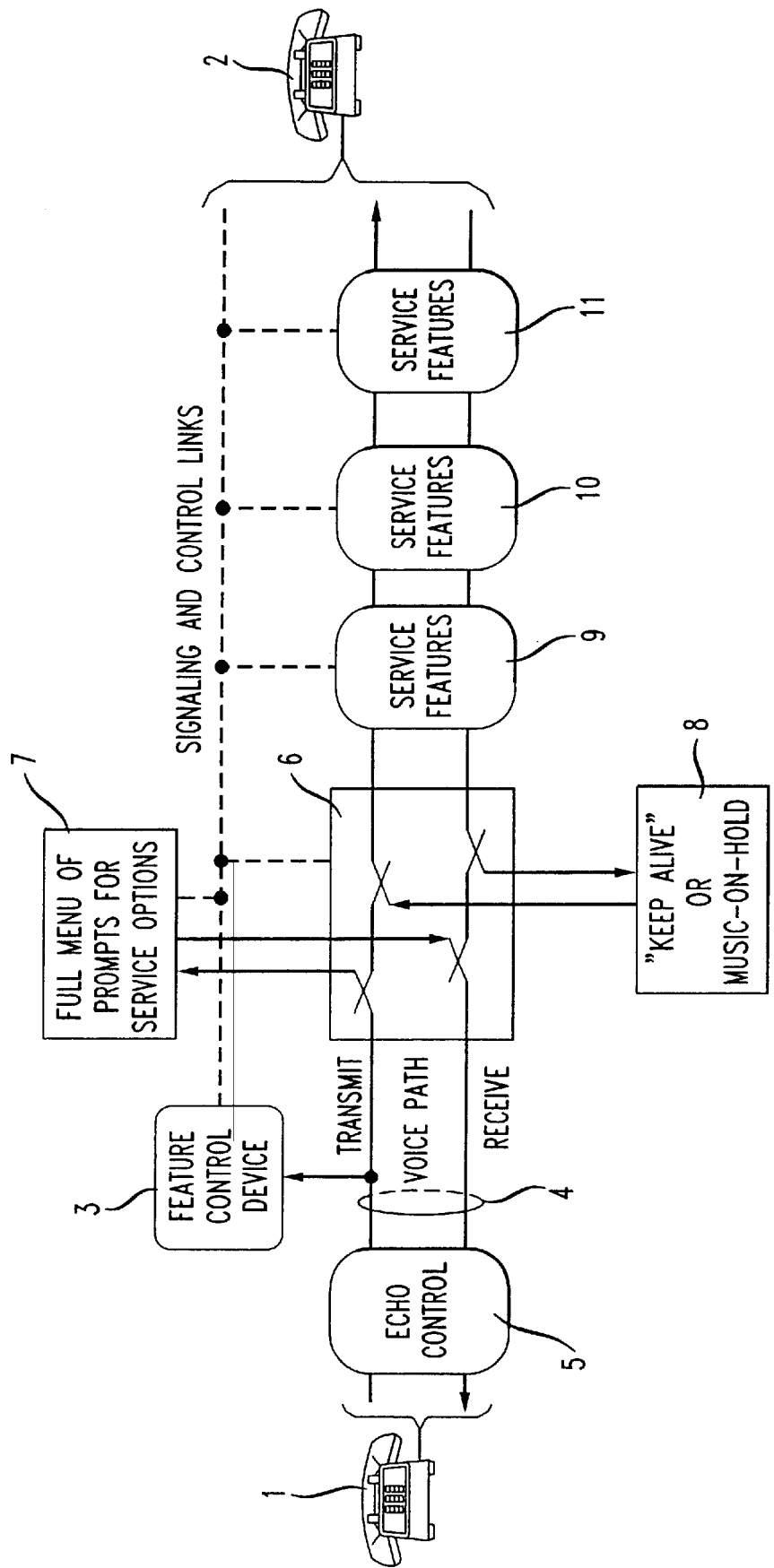

METHOD OF INITIATING A CALL FEATURE REQUEST

CROSS-REFERENCE TO RELATED APPLICATION

This is a continuation of U.S. patent application Ser. No. 09/111,302 filed Jul. 7, 1998 now U.S. Pat. No. 6,504,912.

BACKGROUND OF THE INVENTION

The present invention relates generally to the field of telecommunications and related systems. More particularly, the invention is directed to a method for initiating a feature request during an active telephone call.

As known in the prior art, there are many service features that could be of use during an active telephone call. These features include, for example, adding another party, obtaining operator services, transferring a call, reporting a trouble condition and changing the connection's transmission characteristics. However, in today's person-to-person connections there are no convenient methods of requesting those services once the call is in place.

One method of signaling to the telephone network that a new feature is desired is by using the TOUCH-TONE transmitters (dual-tone multi frequency (DTMF) signaling) built into the majority of telephone sets used in North America and in many telephone sets throughout the world. Most telephone networks can easily recognize those DTMF signals and the digits transmitted can be interpreted as a code for the service requested.

The problem with using DTMF signaling to request network features during an active call is that so many other network and non-network devices make use of DTMF signals. There are few industry standards constraining how DTMF signals are used once the network connection is established. For example, voice-mail systems, answering machines and numerous other command responsive devices use their own proprietary DTMF commands to control their password, playback functions and/or control functions. If a network were using DTMF signals to initiate some of the network features noted above (call transfers, trouble reports and the like) there is a good possibility it would misinterpret DTMF signals intended for voice-mail systems.

Requiring longer strings of DTMF digits to initiate network feature requests would reduce the probability of network confusion at the expense of more complicated, and thus costly, command parsing circuitry. Moreover, a departure from the present and well established use of DTMF digits would in all likelihood render obsolete large numbers of installed voice-mail systems and other such devices. Furthermore, requiring the use of long strings of DTMF digits would be inconvenient to remember and is counter to friendliness that technology should strive to provide.

Another approach to initiating service features is through spoken word commands. Speech recognition is advancing as a technology and might be considered by some as a viable way of initiating feature requests in the middle of a call. In theory, a spoken command such as "Connect us to the Operator" could trigger a special network action. Unfortunately, the accuracy of today's speech recognition technology is still not high. If the spoken commands were short, the network might easily confuse it with similar, but different speech phrases. Furthermore, no matter what command is used, there is the very real possibility that the command phrase would occur in actual conversations without the speaker actually wanting the network to take action. Selecting longer spoken phrases as triggers would reduce the probability of false detection, but would increase the probability that the network would not recognize the command due to the speaker's unique diction, timing or accent, or due to transmission distortion in the network. Using longer commands would also greatly increase the complexity and cost of the signal processing needed for the command recognition. Longer phrases would also be more difficult to remember.

Flashing the switchhook on the telephone set is a conventional method for requesting a mid-call change in telephony features. Unfortunately, switchhook flashes are not propagated through the first network switch or PBX. Thus, a downstream network provider, such as an interexchange carrier, cannot use switchhook flashes to trigger feature requests.

U.S. Pat. No. 5,524,139 illustrates another approach to initiating additional telephone network features. This patent describes a system that a user deliberately calls and then trains on how to call other "automated telephonic information services" (ATIS). In other words, if a telephone user routinely calls a certain DTMF-driven weather forecast from one ATIS and a particular set of stock quotes from a different ATIS, the system of the '139 patent can be used to replace those two calls. The '139 system can be "trained" to recognize simple specific spoken commands (like "quote AT&T price") and generate the necessary (and sometimes complex) DTMF sequences that will operate the downstream ATIS. After training, the user must call the '139 system and give it the user's personal voice and DTMF commands. The system can then run autonomously, perhaps dumping the results of its operations onto the user's voice-mail system. Thus a system as proposed by the '139 patent (a) requires a user to dial a particular number and cannot be initiated from within an arbitrary existing call, and (b) even though it uses both DTMF signals and speech recognition, it requires individualized user training in order to respond appropriately.

Accordingly, there is a great need in the art for an improved method of signaling to the network from within an existing telephone call that other features are desired.

SUMMARY OF THE INVENTION

Accordingly, it is an object of the present invention to obviate the above-noted shortcomings and disadvantages of prior art approaches to initiating feature requests in a telephone network.

It is a further object of the present invention to provide a method of initiating feature requests in a telephone network without imposing inconvenience to the user.

It is a still further object of the present invention to provide a method of initiating feature requests in a telephone network which is economical to implement and simple in operation.

It is a further object of the present invention to provide a method of initiating feature requests in a telephone network which is self-contained and is not reliant on outside systems for its operation.

It is a still further object of the present invention to provide a method of initiating feature requests in a telephone network which can be readily installed in existing telephone networks.

BRIEF DESCRIPTION OF THE DRAWING

The novel features of the present invention are set out with particularity in the appended claims, but the invention will be understood more fully and clearly from the following detailed description of the invention as set forth in the accompanying drawing in which:

FIG. 1 is a block diagram illustrating the implementation of the method of initiating feature requests in a telephone network in accordance with the present invention.

DETAILED DESCRIPTION OF THE PREFERRED EMBODIMENT

A preferred embodiment of the present invention will now be described with reference to the accompanying drawing.

Applicants have recognized that DTMF signaling and the spoken word are two tools telephony users almost always have at their disposal to request service features during a telephone calls. Applicants have found that DTMF receivers in combination with a very simple voice recognition scheme can be combined with a timer to unambiguously and reliably detect a user's mid-call need for new features.

In accordance with the present invention, the telephony user is instructed to press one or two DTMF digits and then speak a single word or very short phrase. In response, the network either provides the feature implied by the particular combination, or the network connects the user to a separate system (or human operator) that can then prompt for more information about the particular feature requested.

For example, the user could press "*" and "#" followed by saying "louder" for an increase in connection volume. Alternatively, "*" and "#" followed by saying "AT&T" could be used to signal a desire for any one of several features offered by the AT&T network, for example. At that point, the AT&T network could connect the user to a series of prerecorded prompts to identify which specific feature is being requested. During this detailed service requests phase, the connection to the other party in the call is held and possibly tied to a repeated "keep alive" prompt such as "Please wait while new services are requested" or tied to music-on-hold. When the feature request is completed, both ends of the call are reconnected with any new features completed or in effect.

The advantages to the network of the approach outlined above are that (1) the one or two DTMF signals can be easily and unambiguously recognized, (2) a very simple speaker-independent word recognition algorithm can be used to recognize very few words like "louder", "softer" and/or "AT&T" and (3) the mutual context of these two events assures the service provider that this is the expected command and that these DTMF signals are not intended for any other DTMF-driven system on the call. Appropriately selected, the spoken words in the commands would have sufficient phonetic information to be (a) easily recognized and (b) easily distinguished from each other, independent of the speaker's diction or network transmission characteristics.

Using the service-provider's name, e.g., AT&T, MCI, Sprint and/or Qwest, as the spoken part of the command reinforces the user's association with the brand. In addition, using the service-provider's name as the keyword also easily distinguishes whose services are being requested during a call crossing multiple service providers' jurisdictions (e.g., spanning local, interexchange, and international carriers.)

From the users' perspective, one or two DTMF tones and one or two spoken words are easy to remember as a command set. In accordance with the present invention, users can then benefit from menu-driven access to all of the features offered by their service provider. DTMF tones can be used during the detailed feature selection phase while any other DTMF-driven devices are shielded from confusion about the purpose of those tones.

The service provider may predetermine the exact ordering of the keyword(s) and the DTMF tone(s) and informs their customers. Appropriate equipment on the network recognizes the command when the tones and words are detected in the correct order within a predefined time limit. A location within the network for such equipment is at the edge of the network, prior to the first network switch. Such a location makes available to calls, including calls that traverse only one network switch, the full set of features that can be initiated with this command set. In order to reduce the possibility of confusion over which end of the call is initiating the feature request, a device for canceling network echoes can be located upstream of the DTMF and speech decoding equipment.

FIG. 1 illustrates the implementation of the present invention in a telephone system. The in-progress call includes user telephones 1 and 2 and the present invention implemented as feature control device 3. Device 3 is located in the "four-wire" portion 4 of the telephone network where the two directions of the voice signal (transmit and receive) are carried separately. Echo control device 5 shields the invention from confusion due to echoes. Device 3 includes speech and DTMF tone recognition circuitry as is known in the art. Thus, device 3 can reliably detect and respond to feature requests during an active telephone call.

As shown in FIG. 1, feature control device 3 is "listening" only to signals coming from telephone 1 toward telephone 2. Although not shown in FIG. 1, an identical feature control device may be used to "listen" for requests for features coming from telephone 2.

If device 3 recognizes the correct combination of DTMF tones and spoken words from telephone 1, it will either invoke the appropriate network features or it will use switching device 6 to connect telephone 1 to a network device 7 that can prompt for detailed information about the desired features. Network device 7 makes available a menu of prompts and service options. While the user of telephone 1 is selecting features, telephone 2 may be temporarily connected to a "keep alive" signal such as music-on-hold 8, also using by switching device 6. The requested service features 9, 10, and/or 11, for example, may then be provided to the caller in accordance with the caller's request.

If only part of the command for additional service features is detected by feature control device 3 (e.g. the DTMF signals), and within a predetermined time limit the other part (e.g. the spoken word) is not detected, no network actions are taken at all. Device 3 may include a watch-dog type timer for this purpose as is known in the art.

Unlike the system described above with respect to U.S. Pat. No. 5,524,139, the system of the present invention does not ask the user to physically call another system or entity. In that sense, the system of the present invention is a PASSIVE tool and may be implemented in a way that it is always present on every call whenever the customer might need it. The system of the present invention is always "listening" to every call and automatically invokes a menu of network services whenever it hears the pre-specified "escape" command.

While prior art systems make it possible for a network to monitor calls and take action when the network believes it hears a proper command, the present system requires both unambiguously detected DTMF tones and proper detection of an adjacent spoken word. Such a requirement prevents the false triggering of network actions that would occur with DTMF tones alone (which are quite prevalent even in the middle of present day telephone calls) and false triggering that would occur based on spoken words alone (the user may or may not intend that the network respond to any particular sequence of spoken words).

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

What is claimed is:

1. A method performed during an in-progress telephone call established over a telephone network, the method comprising modifying at least one characteristic of said in-progress call in response to receipt of at least one DTMF digit followed by receipt of at least one spoken command at apparatus within the network, the modifying being carried out in a way that is determined by which of a plurality of different combinations of DTMF digits and spoken commands was received at said apparatus, and said modifying being carried out only if both said spoken command and said DTMF digit are received and only if said spoken command is received within a predetermined time after said DTMF digit was received, both said a) at least one DTMF digit and b) at least one spoken command being received independent of any prompting signals having been supplied from said apparatus.

2. The invention of claim 1 wherein said at least one characteristic comprises the constituent parties of said call.

3. The invention of claim 1 wherein said modifying at least one characteristic comprises adding an operator to said call.

4. The invention of claim 1 wherein said at least one characteristic is a transmission characteristic of the call connection.

5. The invention of claim 1 wherein said at least one characteristic is loudness.

6. A method performed by a telephone network during an in-progress telephone call established over a telephone network, the method comprising the telephone network modifying at least one aspect of said in-progress call in response to receipt of at least one DTMF digit followed by receipt of at least one spoken command at apparatus within the network, the modifying being carried out in a way that is determined by which of a plurality of different combinations of DTMF digits and spoken commands was received at said apparatus, said modifying being carried out only if both said spoken command and said DTMF digit are received and only if said spoken command is received within a predetermined time after said DTMF digit was received, and said at least one aspect of said in-progress call being other than information content being communicated during said call, both said a) at least one DTMF digit and b) at least one spoken command having been received independent of any prompting signals being supplied from said apparatus.

7. The invention of claim 6 wherein said at least one characteristic comprises the constituent parties of said call.

8. The invention of claim 3 wherein said modifying at least one characteristic comprises adding an operator to said call.

9. The invention of claim 8 wherein said at least one characteristic is a transmission characteristic of the call connection.

10. The invention of claim 8 wherein said at least one characteristic is loudness.

* * * * *